United States Patent [19]

Steinkraus et al.

[11] Patent Number: 4,808,638

[45] Date of Patent: Feb. 28, 1989

[54] THIOLENE COMPOSITIONS ON BASED BICYCLIC 'ENE COMPOUNDS

[75] Inventors: Walter J. Steinkraus, Wayzata, Minn.; John Woods, Dublin, Ireland; John M. Rooney, South Glastonbury, Conn.; Anthony F. Jacobine, Meriden, Conn.; David M. Glaser, New Britain, Conn.

[73] Assignee: Loctite Corporation, Newington, Conn.

[21] Appl. No.: 99,676

[22] Filed: Sep. 21, 1987

Related U.S. Application Data

[63] Continuation-in-part of Ser. No. 917,962, Oct. 14, 1986, abandoned.

[51] Int. Cl.$^4$ .............................................. C08G 75/04
[52] U.S. Cl. ........................................ 522/24; 522/64; 522/66; 522/99; 522/167; 522/168; 522/169; 522/173; 522/180; 528/25; 528/26; 528/30; 528/128; 528/173; 528/205; 528/344; 528/360; 528/361; 528/364; 528/376
[58] Field of Search ............... 526/281; 528/205; 522/24, 64, 66, 99, 167, 168, 169, 173, 180; 528/25, 26, 30, 128, 173, 344, 360, 361, 364, 376

[56] References Cited

U.S. PATENT DOCUMENTS

| | | | |
|---|---|---|---|
| 2,398,479 | 4/1946 | Vaughan et al. | 204/158 |
| 3,379,706 | 4/1968 | Wilke | 526/171 |
| 3,632,824 | 1/1972 | Fitton | 526/171 |
| 3,666,476 | 5/1972 | Dann | 430/611 |
| 3,715,330 | 2/1973 | Nogami | 560/90 |
| 3,763,101 | 10/1973 | Jones | 528/205 |
| 3,770,787 | 11/1973 | Burnett | 526/241 |
| 3,787,303 | 1/1974 | Guthrie et al. | 204/159.15 |
| 4,045,404 | 8/1977 | Stephen | 260/45.8 |
| 4,435,497 | 3/1984 | Irving | 522/180 |
| 4,525,553 | 6/1985 | Rooney | 526/120 |
| 4,575,544 | 3/1986 | Rooney | 526/118 |
| 4,707,432 | 11/1987 | Gatechair et al. | 430/281 |

FOREIGN PATENT DOCUMENTS 28314 11/1984 Australia .
38551 2/1985 Australia .
981346 1/1965 United Kingdom .

OTHER PUBLICATIONS

Gould, Mechanism & Structure in Organic Chemistry, Holt Reihart & Winston, N.Y. (1959), 594–599.
The History of Organic Chemistry in the United States, 1875–1955, Dean Stanley Tarbell & Ann Tracy Tarbell, (1986) pp. 17, 230–231.
Organic Chemistry of Sulfar, S. Oae, University of Tsukuba, University of Tsukuba, Ibaraki, Japan, pp. 122–123.
A. A. Oswald et al., (See Attached for Title), J. Org. Chem. 26, 3948–3957 (1961).
A. A. Oswald (See attached for title), J. Org. Chem., 25, 467–469 (1980).
S. J. Christol et al., (See Attached for title), J. Am. Chem. Soc., 80, 635–640 (1958).
C. R. Morgan et al., (See Attached for title) J. Poly. Chem.: Poly. Chem. Ed., 15, 627–644 (1977).
J. A. Berson et al., (See Attached for title), J. Org. Chem., 52 3316–3319 (1987).
Gould, "Mechanism and Structure in Organic Chemistry", pp. 686–687, Holt, Rinehart and Winston (1959).

*Primary Examiner*—John C. Bleutge
*Assistant Examiner*—David Buttner
*Attorney, Agent, or Firm*—Vidas & Arrett

[57] ABSTRACT

A curable thiol-ene formulation comprising
(a) a polythiol
(b) a 'ene compound having a plurality of groups of the formula:

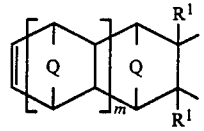

where Q is $CH_2$, $CHCH_3$, $C(CH_3)_2$, O, S, $NR^1$ or $SO_2$, $R^1$ is H or alkyl, and m is 0–10, and
(c) an effective amount of a free radical initiator.

23 Claims, No Drawings

THIOLENE COMPOSITIONS ON BASED BICYCLIC 'ENE COMPOUNDS

This application is a continuation-in-part of Ser. No. 917,962, filed Oct. 14, 1986, now abandoned.

FIELD OF THE INVENTION

This invention pertains to thiolene compositions in which the 'ene compound is a compound or resin having a plurality of groups of the formula:

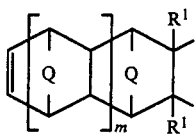

I where Q is $CR^1_2$, O, S, $NR^1$, or $SO_2$; $R^1$ is H or alkyl and m is 0–10.

Further aspects of this invention pertain to novel norbornenyl ester resins within the scope of formula I, and to novel polyimides formed by thiolene curing of nadimide resins.

BACKGROUND OF THE INVENTION

Resins within the scope of formula I. are known. Nadimide terminated resins, that is resins of the formula:

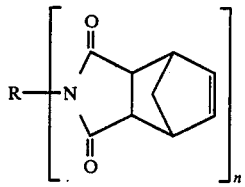

II where n is an integer of 2 or more and R is an n-valent radical, are described in Scola et al, "Synthesis and Polymerization of Aliphatic Bisnadimides," J. Applied Polymer Science, 26 231-247 (1981); NASA Technical Memorandum 81976 (1981); NASA Technical Memorandum 83141; and St Clair et al "Polyimide Adhesives; Modified with ATBN and Silicone Elastomers," in Polymer Science and Technology I.F. Plenum 29 467–479 (1984). In these references the resins typically must be cured by a thermal reaction above the melt temperature under pressure and/or nitrogen to prevent the elimination of cyclopentadiene by reverse Diels-Alder reaction. Bismaleimide and bisnadimide compounds are also described as additives for free radically cured urethane acrylate formulations in G.B. Pat. No. 1546815 and U.S. Pat. No. 3,988,299.

In U.S. Pat. No. 4,560,768 polyimido-ester compounds of the formula:

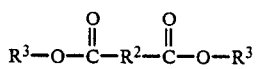

III where $R^2$ is an olefinically unsaturated group and $R^3$ is:

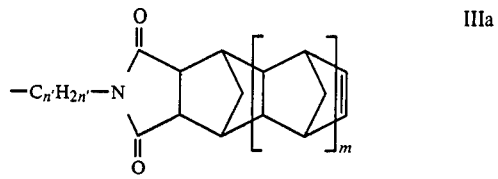

IIIa where n' = 1–6, are described. These compounds may be used to improve thermal aging resistance of radically cured unsaturated resin-monomer formulations.

In U.S. Pat. No. 4,085,164 there are described thermo setting peroxide cured formulations of bisimide compounds, which reportedly may include nadimide compounds, and polyurethane elastomers.

Other resin compounds having groups of the structure shown in Formula I are isoimide resins described in U.S. Pat. No. 4,495,342 such as:

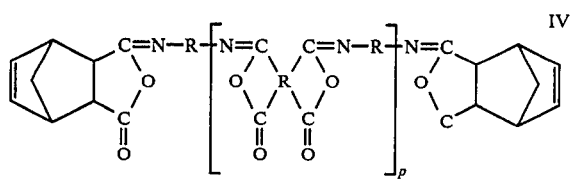

IV where p is 0–30 these resins are also cured by thermal reaction.

While some of the foregoing described resin systems are formulations which will cure to solids at ambient temperatures, the norbornene groups will not crosslink into the system until the temperature is substantially elevated (eg. in excess of 200 degrees F.). Photocuring of these formulations is not practical because of the very strong UV absorbence of the imide groups.

Silicone imide resins and silyl norbornene anhydride compounds are described in U.S. Pat. Nos. 4,381,396; 4,472,565; and 4,404,350. These compounds are prepared by hydrosilation of the double bond in a nadimide or nadic anhydride compound.

Free radical cured thiol-ene systems have been known for a long time. The reaction involves addition of S—H-Groups across a olefinic or acetylenic double bond. Detailed discussion of the mechanism of this reaction and of the academic literature in this field may be found in Oae, ed., "Organic Chemistry of Sulfur", Plenum Press, New York, N.Y., pp. 131-187 (1977). Oswald et al reportedly disclosed photocrosslinkable compositions employing tetraallyl ester compounds and dithiols at the April 1965 ACS meeting in Detroit, Mich. See Oswald et al, Die Makromolekulare Chemie, 97, 258-266 (1966). Formulations of di-or poly-thiols and dienes or polyenes which are curable to solids by chemical or photolytic radical generators are also described in U.S. Pat. Nos. 2,767,156; 3,661,744; 3,240,844; 4,119,617; and 4,157,421. All of these prior art curable formulations have involved polythiol additions to double bonds in linear olefins or acetylene compounds.

Silicone polymers having alkyl thiol groups are disclosed in U.S. Pat. No. 4,289,867 and background references discussed therein. In U.S. Pat. No. 4,284,539 other silicones having linear and cyclic mercaptoalkyl groups are described as are the thiol-ene reactions of such materials with silicones having vinyl or silacylopentene groups. Peroxide cured compositions of vinyl terminated silicone and silicone or organic polythiols are described in U.S. Pat. No. 3,445,419.

Addition of thiols to six membered cyclic olefins such as cyclohexene is known but rate studies indicate that the rate of reaction to be extremely slow relative to allylic or vinylic compounds. See Oae, ed., "Organic Chemistry of Sulfur" Page 133. Thiol additions to norbornene have also been studied but apparently only for steric information. Oae Page 134–135. Addition of diethyl dithio phosphoric acid to dicyclopentadiene and norbornadiene is described in J. Org. Chem., 28 1262–68 (1963), however, this paper does not provide any relative correlation between reactivities of thiophosphate groups and organothio groups.

Crivello has described the preparation of polyimidothiothers by base catalyzed addition of dithiols to bismaleimide compounds. It is known, however, from the work of Oswald, cited above, that the maleimide bond is not subject to radical catalyzed thiol addition.

In U.S. Pat. No. 4,435,497 to Irving there are described polymerizable two component compositions in which the first component is a compound containing at least one each of (meth)acryloxy groups; allyl, methallyl, or 1-propentyl groups bonded through an oxygen or oxycarbonyl group to a aromatic or cycloaliphatic nucleus; and carboxylic acid groups. The second component is a polythiol. Irving teaches that the first component preferably does not include ethylenic unsaturation other than in the (meth)acryloxy, allyl, methallyl and 1-propentyl groups. However, the reference also does include partial esters of endomethylenetetrahydrophthalic acid with various (meth)acryloxy and allyl or methallyl substituted alcohols. Nothing in this reference, however, teaches or suggests that the norbornenyl structure which exists in such partial esters is capable of useful thiolene cross-linking reactions or that any of the three specifically required groups (i.e. acrylic, allylic, and carboxylic acid) could be dispensed with.

Thus, heretofore it has not been suggested that practical radically catalyzed thiolene crosslinkable systems can be prepared using compounds or resins having a plurality of norbornene groups as the 'ene compound.

SUMMARY OF THE INVENTION

In one aspect the invention comprises a curable composition of a polythiol and a polyene in which the polythiol is a compound or resin defined by the formula $R^4(SH)_n$ where $R^4$ is a n valent organic or silicone residue and n is a integer of two or more; and the polyene is a compound or resin having a plurality of groups of formula I above. The norbornene compounds of the invention are free of allyl, methallyl and 1-propentyl groups attached either directly or through an oxygen atom or an oxycarbonyl group to an aromatic or cycloaliphatic nucleus and they are preferably substantially free of any allyl, methallyl, 1-propentyl, or (meth)acryloxy groups regardless of location. Suitably the resins are free of any other 'ene group including internal 'ene structures such as our present in butadiene polymers. The norbornene compounds useful in the invention may also be free of carboxylic acid groups. This composition further comprises a free radical initiator such as a radical photo-initiator, a peroxide compound or a azonitrile compound.

A second aspect of this invention is a composition as described above where the 'ene resin is a nadimide resin. A further aspect of this invention is a method or curing a nadimide resin comprising mixing the resin with a polythiol compound and a free radical generating compound and exposing the mixture to radical generating conditions. By this method it is possible to produce crosslinked polyimide films or articles at ambient or near ambient temperatures.

A still further aspect of the invention is a curable nadimide composition or method as just described in which the free radical generator is a mixture of a peroxide compound and a complex salt photoinitiator of a $\eta^6$, $\eta^5$ iron arene cation and a non-nucleophilic anion. Such compositions are curable on exposure to visible light.

Yet another aspect of the invention is a composition as first described in which the 'ene resin is a compound having a plurality of norbornenyl ester groups of the formula:

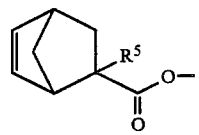
V where $R^5$ is H or methyl, particularly the resins:

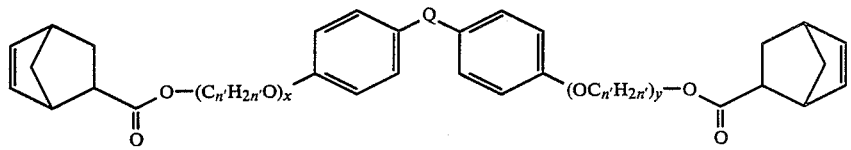
VI where Q and n' are as previously defined and x and y are integers of 1 or more. These norbornenyl ester resins themselves, as well as their methods of preparation, comprise yet further aspects of the invention.

The norbornenyl ester resins have been shown to significantly mask the unpleasant mercaptan odor which is usually associated with cured thiolene formulations.

DETAILED DESCRIPTION OF THE INVENTION

Polythiol ingredients may be any of those known in the prior thiolene art. A description of the most common thiolene compounds may be found at Column 9, Lines 1–41 of U.S. Pat. No. 3,661,744. Certain polythiols such as the aliphatic monomeric polythiols(ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thioglycolic acid (HS—CH₂COOH), α-mceraptopropionic acid (HS—CH(CH₃)—COOH and β-mercaptopropionic acid (HS—CH₂CH₂COCH) with polyhydroxy compounds such as glycols, triols, tetraols, pentaols, hexaols, and the like. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), all of which are commercially available. A specific example of a preferred polymeric polythiol is polypropylene ether glycol bis(β-mercaptopropionate) which is prepared from polypropylene-ether glycol (e.g. Pluracol P201, Wyandotte Chemical Corp.) and β-mercaptopropionic acid by esterification. Poly-α-mercaptoacetate or poly-β-mercaptopropionate esters, particularly the trimethylolpropane triesters or pentaerythritol tetra esters are preferred. Other polythiols which may be suitably employed include alkyl thiol functional compounds such as 1,2-dimercaptoethane, 1,6-dimercaptohexane and the like. Thiol terminated polysulfide resins may also be employed.

Where the norbornene compound is suitably compatable, polyorganosiloxanes having alkylthiol groups such as mercaptomethyl, 2-mercaptoethyl, or 3-mercaptopropyl groups; mercaptocyclosilapentane groups; or organo groups terminated by mercapto carboxylate esters, may be employed. Such silicones are described, for instance, in U.S. Pat. Nos. 3,445,419, 4,284,539, and 4,289,867, incorporated herein by reference.

Mercaptoalkyl alkoxy silane compounds which can be incorporated into silicone polymers by known silicone polymerization, crosslinking or equilibration techniques and their method of preparation are described in U.S. Pat. No. 4,556,724.

The norbornene resins useful in the invention include the nadimide resin of formula II above and the imide ester and isoimide resins of formulas III and IV above. Formulations of such resins and polythiols may be cured by peroxides using heat or conventional ambient temperature peroxide accelerators; or with thermally activated azeonitrile catalysts such as 2,2'-azobis-(isobutyoronitrile), in conventional amounts. The films of such resin formulations may be photocured with UV irradiation in the presence of conventional radical photoinitiators but the strong UV absorbtions of the imide or isoimide groups make this option extremely limited.

Norbornene imide or isoimide/polythiol compositions of the invention may be readily photocured, however, with visible light when the composition also contains a $\eta^5$, $\eta^6$ iron arene complex of the formula:

$$\begin{array}{c} R^6 \\ | \\ Fe^+ \quad LZ_k^- \\ | \\ R^7 \end{array} \quad \text{VII}$$

where $R^6$ is a $\eta^6$ arene such a benzene, toluene, mesitylene, xylene, methoxybenzene, chlorobenzene, cumene p-chlorotoluene, naphthalene, methoxynaphthalene, methylnapthalene, chloronaphthalene, biphenyl, indene, pyrene, or diphenylsulfide; $R^7$ is the anion of a cyclopentadienyl compound such as cyclopentadiene, acetylcyclopentadiene, benzoyl cyclopentadiene, butylcyclopentadiene, amylcyclopentadiene, indene and the like; L is di- to heptavalent metal or metaloid, Z is a halogen and k is equal to 1 plus the valence of L. Examples of ions $LZ_K^-$ include $SbF_6^-$; $BF_4^-$, $AsF_6^-$, and $PF_6^-$. Examples of such compounds include:

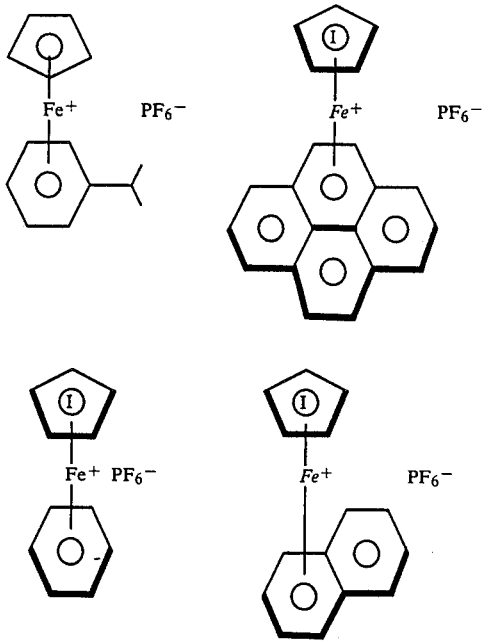

The cumyl compound is available from Ciba-Gigy Ltd., Basle, Switzerland under the number CG 24-61. The other three compounds are described in Meier, et al, Paper FC 85-417, presented at the Radcure Europe '85 Conference, May 6-8, 1985. Further compounds of this type are described in EP No. 0094915. Such complex catalysts are used together with a peroxide compound such as benzoyl peroxide, cumene hydroperoxide, methylethyl ketone peroxide etc. Preferred peroxide compounds are hydroperoxides. Both the iron arene complex and the peroxide are suitably employed at levels of 0.01-8%, preferably 0.5-5% by weight of the composition.

The combination of a $\eta^5$, $\eta^6$ iron arene complex catalyst and a peroxide is an effective visible light photoinitiator for radically cured resin systems generally, such as prior art thiolene systems of U.S. Pat. Nos. 3,661,744 and 4,119,617, incorporated herein by reference. However, as noted above, it is especially useful with the imide resin systems since they enable deep section photocuring which is otherwise unachievable. The combination is effective for initiating polymerization with UV or visible light without added photosensitizer compounds.

In addition to imide and isoimide resins described above, further norbornenyl functional resins which may be utilized in the inventive thiol-ene formulations include polyesters or half ester/half acid compounds obtained from esterification of nadic anhydride with compounds having plural hydroxy groups can likewise be employed in the inventive formulations. Such compounds may be represented by the formulas:

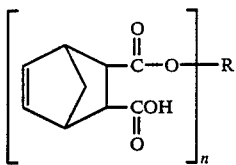
VIII

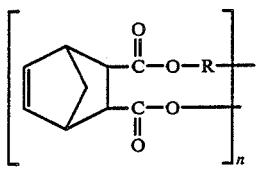
IX where R is the residue of the plural hydroxy compound.

Of the foregoing compounds the nadimide compounds are preferred.

Another class of norbornene compound which may be employed in the inventive formulations are novel norbornenyl acetal resins having multiple groups of the formula:

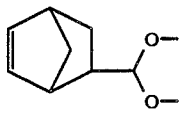
X

Such compounds can be prepared from the norbornenyl aldehyde:

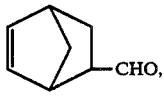
XI by condensation with compounds having at least 2 hydroxy groups. Cyclic acetals such as:

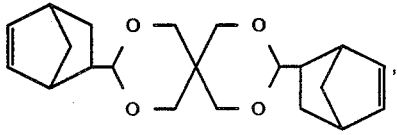
XII which may be prepared by condensation of pentaerythritol with the norbornenyl aldehyde above, are preferred. If trimethylol ethane or glycerine is used in place of pentaerythritol, mononorbornenyl cyclic acetal compounds of the formulas:

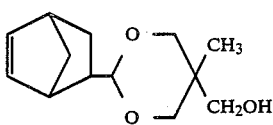
XIII or

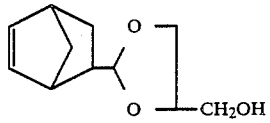
XIV are obtained. These compounds can be utilized to prepare polyfunctional norbornene resins useful in the inventive formulations by reaction with polyisocyanates such as toluene diisocyanate, polyepoxides, carboxylic anhydrides, dicarboxylic acids or other compounds having multiple groups reactive with the residual hydroxyl group. While reaction with 1,2- or 1,3- diols is preferred, any diol or polyol can be used if a non-cyclic polyacetal is desired. The starting norbornenyl aldehyde can be obtained by Diels-Alder addition of cyclopentadiene to acrolein.

A still further class of norbornene resin suitable for use in the inventive formulations are esters, amides or thioesters prepared by Diels-Alder addition of cyclopentadiene to compounds having multiple (meth)acrylate (ie acrylate or methacrylate) groups, acrylamide groups or thio(meth)acrylate groups. These resins may be represented by the formula:

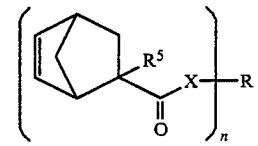
XV where $R^5$ is H or methyl and X is O, S or $NR^1$.

The (meth)acrylic resins are preferred. There are a wide variety of (meth)acrylic esters available or described in the literature, including epoxy acrylate resins (ie polyepoxides reacted with acrylic or methacrylic acid), and (meth)acrylate capped polyether, polyesters, urethanes, silicones or polyphosphazene polymers. This synthesis method makes it possible to readily synthesize these norbornyl ester resins of the invention with any backbone presently available for (meth)acrylic esters.

Of course, the norbornenyl ester resins of the invention can also be prepared by reacting the reacting (meth)acrylic acid, acid chloride or acid anhydride with cyclopentadiene followed by esterification of the resulting norbornenyl acid, acid chloride or acid anhydride. The preferred reaction, however, is to produce the inventive bicyclic ester from an acrylate or methacrylate ester.

As between acrylate and methacrylate esters, the acrylate esters are preferred because of their greater reactivity to cyclopentadiene. Acrylic esters will generally react spontaneously at or near ambient temperatures with cyclopentadiene whereas methacrylic esters require a catalyst.

In the inventive thiol-ene formulations the norbornenyl compounds, particularly norbornenyl esters derived from (meth)acrylic esters have the further advantage that they appear to mask the residual thiol odor which commonly can be detected in thiol-ene cured products. The odor of conventional cured thiol-ene formulations is weak but still considered so offensive by many people that it adversely affects the commercial exploitation of the prior art thiol-ene systems.

It should be noted that while the system has been so far described primarily in terms of norbornene compounds, other compounds within formula I, for instance where the divalent bridge group Q is CHCH$_3$; C(CH$_3$)$_2$; O, S, NR$^1$, or SO$_2$ may also be employed in the inventive formulations. Such compounds can be prepared by Diels-Alder condensation reactions analogous to those described above except that in place of cyclopentadiene a compound of the formula:

XVI is used, where Q$^1$ is any Q group other than CH$_2$.

The mole ratio of ene groups to thiol groups in the inventive formulations may vary from about 0.1/1 to 5/1, preferably from about 0.75/1 to about 5/1, preferably from about 0.75/1 to about 1.5/1.

As the desired thiolene reaction occurs between thiol and norbornene groups, it is generally desired that other reactive unsaturated hydrocarbon groups be excluded from the 'ene compound. In particular, allyl, 1-propenyl or methallyl groups bonded to an aromatic or cycloaliphatic nucleus as set forth in U.S. Pat. No. 4,435,497 should not be present on the molecule. Preferably, such groups are not incorporated anywhere on the 'ene molecule. Similarly, it is also desirable that the 'ene compound be substantially free of (meth)acrylic groups, although it may not be possible to entirely eliminate such groups if the norbornene compound is prepared by Diels-Alder reaction of an acrylate or methacrylate compound with cyclopentadiene or analogs thereof as discussed above.

Carboxylic acid groups are also unnecessary to the 'ene resin. Such groups, however, may also be present as a result of the synthesis method, such as when the norbornene resin is prepared by esterification of a polyol with nadic anhydride.

The cure initiator component may be employed in any amount conventional for other thiolene systems. Typically the cure initiating component will be present in the range 0.05–8%, more typically 0.5–5% by weight of the composition.

Depending on the use, the other ingredients may optionally be incorporated with the resinous composition of this invention, including another prepolymer, polymer, reactive or nonreactive diluent, solvent, extender, filler, dye, pigment, antifoaming agent, silane coupling agent, thixotropic agent, reinforcing material (such as glass fiber and carbon fiber), air-oxidation inhibitor, polymerization inhibitor, and the like.

For storage stable formulations free radical polymerization inhibitors will generally be desired. Common inhibitors such as hydroquinone, BHT and Irganox ™ 1076 may usefully be employed at levels of 0.01–5%, preferably 0.1–1%, by weight of the composition. Certain vinyl compounds such as disclosed in U.S. Pat. No. 3,619,393, incorporated herein by reference, are also useful stabilizers of the inventive compositions. The stabilizer compounds include vinyl phenols, vinyl ethers, vinyl quinones, vinyl substituted quinones, vinyl amines including heterocyclic amines, N-vinyl pyrrolidone, vinyl sulfur compounds, vinyl arsenites, vinyl nitrites, vinyl phosphites, vinyl phosphines, vinyl stannates, vinyl stibines, and vinyl bismuthines. The amount of stabilizer will vary depending on other ingredients and concentrations. Suitably a combination of conventional free radical stabilizers in conventional amounts and 0.1–15% of the vinyl compound as described above may be employed. More preferably the vinyl compounds will be present at levels of 0.5–10%.

The invention may be illustrated by the following non-limiting examples:

EXAMPLE I

A solution of 17.8 g of methyl-5-norbornene-2,3-dicarboxylic anhydride and 5.4 g of 1,3-phenylenediamine in 80 mls of acetone was stirred at room temperature under nitrogen for 0.5 hours. 0.1 g of nickel acetate and 2.5 mls of triethylamine were then added and the mixture heated to reflux temperature. 12.7 g of acetic anhydride were then added and the mixture heated for a further 3 hours. 80 mls of water were added and the mixture was chilled to 2° C. At this state a brown viscous resin precipitated and the solvent mixture was decanted. The resin was dissolved in 90 mls of dichloromethane, washed with 2×100 ml portions of water and dried over sodium sulphate. Removal of the solvent under reduced pressure yielded 18.3 g of a brown viscous resin which was shown by gel permeation chromatography to consist of one major component, higher in molecular weight than either of the starting compounds and a minor component identified as the starting anhydride. The major component is the bis-(norbornene imide) having the formula:

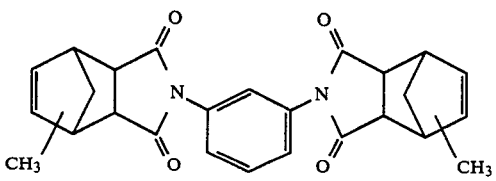

XVII

EXAMPLE 2

A UV light sensitive composition was prepared by dissolving 1.22 g of pentaerythritol tetrakis (β-mercaptopropionate) and 0.1 g of 2,2-dimethoxy-2-phenylacetophenone in 2.14 g of the resin obtained from example 1.

A 50μ thick coating of the composition was prepared on 1×4" microscope glass slide and exposed to UV light from a UVA LOC 1000 ™ medium pressure mercury arc light operating at 80 W/cm. The coated sample was located 10 cm directly under the arc and after 5 seconds exposure had cured to a tack-free film which was found to be insoluble in common solvents.

EXAMPLE 3

A thermally sensitive composition was prepared by blending 0.1 g of Luperox FL (Trade name for 35% benzoyl peroxide dispersion available from Pennwalt Corp.) with 1.0 g of a mixture prepared by dissolving 2.14 g of the resin prepared in example 1 in 1.22 g of pentaerythritol tetrakis (β-mercaptopropionate). After heating the mixture at 95° C. for 2 minutes, a solvent insoluble gel was formed.

EXAMPLE 4

Sartomer 351 ™ (diacrylate ester of ethoxylated bisphenol A, 1 mole) was stirred at 40° C. and freshly cracked cyclopentadiene (2.2 equivalents) was added at such a rate that the reaction temperature rose to ca. 75°

C. The reaction mixture was maintained at 75° C. overnight. The reaction mixture was then stripped on a rotary evaporator. Analysis of the reaction mixture by HPLC showed the conversion to be complete. The product may be represented by the formula:

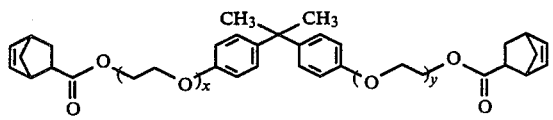

where x+y is an average of 3.4.

EXAMPLE 5

Preparation of tris-1,2,3-(Norborn-5-ene-2-Carboxy)propoxy propane

Propoxylated glyceroltriacrylate (GTPA, Celanese Chemical Corp., 0.33 mole) was stirred in toluene (100 ml) at 45° C. Cyclopentadiene (1.2 mole) was added rapidly and the temperature of the reaction mixture was allowed to rise 65° C. After one hour, the reaction mixture was stripped on a rotary evaporator to yield the tris-bicyclic ene product.

EXAMPLE 6

Preparation of Norborn-5-ene-Terminated-polydimethylsiloxane

A silane terminated polydimethylsiloxane fluid (4400 molecular weight, 440 g, 0.2 equivalents SiH) was stirred in toluene and warmed to 60° C. Bicycloheptadiene (2,5-norbornadiene) was added in an amount in excess of 0.2 moles, followed by chloroplatinic acid solution (1 ml, 2.5% by weight). The reaction mixture was aged at 90° C. for 4 hours, then cooled and stripped to yield the product, a bicyclic ene terminated polysiloxane.

Silicone norbornene resins useful in the invention may also be prepared by selective hydrosilation of vinyl norbornene. The hydrosilation can be selectively restricted to the vinyl group by suitable temperature and ingredient concentration controls. Other silicone norbornene resins useful in the invention can be prepared by Diels-Alder reaction using cyclopentadiene or the like and a (meth)acrylic functional silicone, including those described in U.S. Pat. Nos. 4,640,940, 4,504,629, 4,574,546, and references cited therein.

EXAMPLE 7

Reactive equivalent amounts of the product of example 4 and pentaerythritoltetrathioglycolate were mixed with ca. 1.5% Darocure ® 953 (EM Industries). The formulation was applied as a 20 mil film on glass and exposed to ultraviolet radiation for two seconds. A clear, hard dry to the touch film resulted. When this formulation was applied to a depth of cure comparator and exposed for 5 sec., it gave deep section cure up to 250 mil.

EXAMPLE 8

Equivalent amounts of the norbornene terminated polydimethylsiloxane product of example 6, propylthiopolysiloxane (PS 405, Petrarch Systems) and 2% Darocure ® 953 were mixed and applied as a 20 mil thick film on a glass plate. Exposure to actinic radiation gave a cheesy, cured silicone rubber.

EXAMPLE 9

Several test formulations were prepared to compare the relative rates of polymerization in the thiol-ene polymerization process. These formulations are listed below as well as the results of the comparative cure studies.

Formulation I

Bicyclic ester of Example 4: 30 g
Pentaerythritol tetrathioglycolate (PETTG): 10.8
Darocure 953 ™ : 0.8 g Formulation 2

Furan bicyclic: 30 g
Analog of Example 4 PETTG: 10.8
Darocure 953 ™ : 0.8

Formulation 3

(Comparative formulation)

Ethoxylated bisphenol A dimethacrylate: 25 g PETTG: 10.8 g
Darocure 953 ™ : 0.8

Formulation 4

(Comparative formulation)

Diacrolein Acetal of Pentaerythritol: 21.2 g
Pentaerythritol tetramercaptopropionate: 12.2 g
Irgacure 184 ™ : 0.6 g Formulation 5

Bicyclic Ester of Example 4: 15 g
tris-(Norborn-ene-carboxy)propoxy propane (Example 5): 4.5 g
Cumene Hydroperoxide: 0.3 g
Saccharin: 0.4 g
PETTG: 8.0 g Cure Comparison

| Formulation | Ultraviolet Exposure* | | |
| --- | --- | --- | --- |
| | 1 Sec | 3 Sec | 5 Sec |
| 1 | Surface Cure | Hard Cure | — |
| 2 | Surface Cure | Surface Cure | — |
| 3 | Tacky | Surface Cure | Soft Cure |
| 4 | Surface Cure | Cured | — |

*20 mil films laid down with Gardner Knife, cured in Technocure ® oven ca 12 inches from light source.

Formulation 5 was applied to as received steel lap shears and clamped to 0 mil gap. After 12 hours, the lap shears were fully fixtured.

Formulation 1 was applied to a depth of cure comparator and cured for 5 sec. in a Technocure unit ca 6 inches form the source. The formulation was fully cured and dry to a depth of ca 3.5 mm.

Formulation 4 was similarly applied to the comparator and cured for 5 sec. Liquid resin was observed below the cured film and the formulation was fully cured to a depth of 1 mm.

Under the conditions examined, bicyclic esters based on norbornenecarboxylic acid exhibit cure response equal to or better in the polymerization of thin film and in deep section cure when compared to prior art formulations. A particular advantage of this speed of cure, besides the obvious faster processing times, is the possible use of lower intensity sources for curing the polymer.

In the formulations of the invention it was also observed that no thiol odor could be detected in the cured films. A noticable thiol odor was detected in cured films of comparative Formulations 3 and 4.

EXAMPLE 10

A light sensitive composition was prepared by dissolving 0.4 g of ($\eta^6$-cumene) ($\eta^5$ cyclopentadienyl) iron hexafluorophosphate (CG024-61, Ciba Geigy) and 0.4 g of cumene hydroperoxide in a blend of 12.84 g of the bis(norbornene-imide) derived from the condensation of methyl-5-norborene-2,3-dicarboxylic anhydride and 1,3-phenylenediamine (as described in Example 1) and 7.32 g of pentaerythritol tetrakis($\beta$-mercaptopropionate). A sample of the composition was poured into an open-topped cylindrical mould 8 mm in diameter and 4 mm in depth and the filled mould exposed to UV/visible light from a SUPERLITE 201 (high pressure mercury light source supplied by Lumatec GmbH, Munich, W. Germany) through a 1 m long light guide. The light system was fitted with a filter which cut-off all visible light with wavelengths greater than 530 nm. The sample was placed 10 mm, directly below the tip of the lightguide. After 3 mins. exposure, the sample had completely cured through 4 mm depth forming a solvent insoluble hard gel.

EXAMPLE 11

(Comparative Example)

A light sensitive composition, similar to that described in Example 10 in which the ($\eta^6$-cumene) ($\eta^5$-cyclopentadienyl) iron hexafluorophosphate was replaced with an equal weight of 2,2-dimethoxy-2-phenyl-acetophenone, was prepared and exposed to light as described in Example 10. After 5 minutes exposure, only the top-most layer had cured to a hard solvent insoluble gel. The thickness of this layer was found to be less than 0.5 mm. The remainder of the material was found to be still liquid.

Visible light curing of the inventive formulations can also be accomplished with prior art visible light photoinitiators as evidenced by Examples 12-15 below.

EXAMPLE 12

A visible light sensitive composition was prepared by dissolving 0.18 grams of ($\pm$) camphorquinone in 25 grams of ethoxylated bisphenol A-di-(5-norbornene-2-carboxylate) and 10.17 grams of pentaerythritol tetra(3-mercapto propionate). The formulation was applied between two glass slides and was exposed to visible radiation from a medium pressure Hg lamp through a polycarbonate filter (filters out light below 400 nm.) for sixty seconds, at which time they were found to be fixtured. The resultant rubbery polymer hardened upon room temperature aging.

EXAMPLE 13

A visible light sensitive composition was prepared by dissolving 0.18 grams ($\pm$) camphorquinone, 0.18 grams N',N-'dimethyl-p-toluidine in 25 grams of ethoxylated bisphenol A-di-(5-norbornene-2-carboxylate) and 10.17 grams of pentaerythritol tetra(3-mercapto propionate). The formulation was applied between two glass slides and was exposed to visible radiation from a medium pressure Hg lamp through a polycarbonate filter (filters out light below 400 nm) for 45 seconds, at which time they were found to be fixtured. The resultant rubbery polymer hardened upon room temperature aging.

EXAMPLE 14

A visible light sensitive composition was prepared by dissolving 0.18 grams ($\pm$) camphorquinone, 0.18 grams tert-butyl peroxybenzoate in 25 grams of ethoxylated bisphenol A-di-(5-norbornene-2-carboxylate) and 10.17 grams of pentaerythritol tetra(3-mercapto propionate). The formulation was applied between two glass slides and was exposed to visible radiation from a medium pressure Hg lamp through a polycarbonate filter (filters out light below 400 nm) for sixty seconds, at which time they were found to be fixtured. The resultant rubbery polymer hardened upon room temperature aging.

EXAMPLE 15

A visible light sensitive composition was prepared by dissolving, 0.36 grams of 2,7-fluorenone-bis-[(tert-butyl)peroxy] ester in 25 grams of ethoxylated bisphenol A-di-(5-norbornene-2-carboxylate) and 10.17 grams of pentaerythritol tetra(3-mercapto propionate). The formulation was applied between two glass slides and was exposed to visible radiation as in Examples 12-14 for ten seconds, at which time they were found to be fixtured. The resultant rubbery polymer hardened upon room temperature aging.

It has also been observed that UV curable formulations in accordance with this invention, where any diluents are monofunctional norbornene compounds do not give any observable shrinkage or surface distortion when cured. This suggests such formulations will be especially useful for electronic potting and surface coating applications.

What is claimed is:

1. A curable thiol-ene formulation, said formulation being cureable to a crosslinked polymer and comprising:
   (a) a polythiol,
   (b) a 'ene compound having a plurality of 'ene groups of the formula,

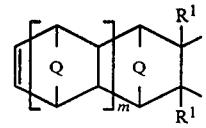

where Q is $CR^1_2$, O, S, $NR^1$ or $SO_2$, $R^1$ is H or alkyl, and m is 0-10, said compound free of allyl, methallyl or 1-propenyl groups, wherein the thiol plus 'ene functionality is greater than four and
   (c) an effective amount of a free radical initiator.

2. A composition as in claim 1 wherein the free radical initiator is a radical photoinitiator.

3. A composition as in claim 1 wherein the free radical initiator is a peroxide or azonitrile compound.

4. A composition as in claim 1 wherein the 'ene compound is a compound having a plurality of nadimide groups.

5. A composition as in claim 1 wherein the 'ene compound has the formula:

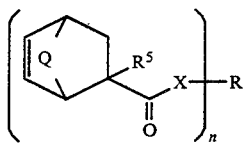

where n is an integer of 2 or more, R is an n-valent radical, $R^5$ is H or methyl and X is O, S, or $NR^1$.

6. A composition as in claim 5 where Q is $CH_2$ or O, X is O and $R^5$ is H.

7. A composition as in claim 5 wherein the 'ene compound is:

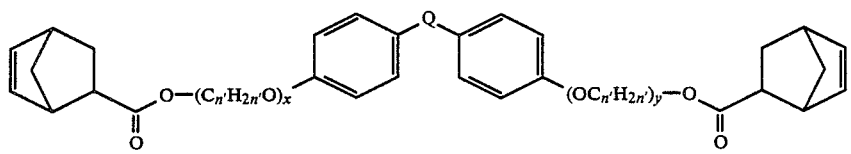

where Q is as defined in claim 1, n' is 1-6 and x and y are integers of 1 or more.

8. A composition as in claim 4 wherein the 'ene compound is:

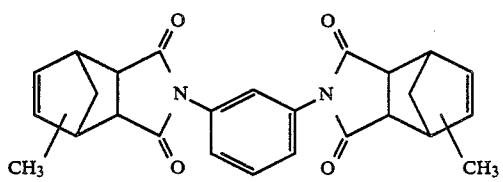

9. A composition as in claim 1 wherein the 'ene compound is a norbornenyl acetal resin having a plurality of groups of the formula:

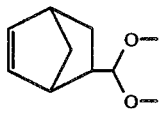

10. A composition as in claim 1 wherein the 'ene resin is a polyorganosilane.

11. A composition as in claim 1 wherein the polythiol is a compound having a plurality of α-mercaptoacetate, α-mercaptopropionate or β-mercaptopropionate ester groups thereon.

12. A composition as in claim 11 wherein the polythiol is a polyorganosiloxane.

13. A composition as in claim 1 wherein the polythiol is a compound having a plurality of alkylthiol groups.

14. A composition as in claim 1 wherein the free radical initiator is a mixture of a peroxide compound and a $\eta^5$, $\eta^6$ iron arene complex salt of the formula:

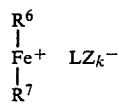

where $R^6$ is an $\eta^6$ arene, $R^7$ is the anion of a cyclopentadienyl compound, L is a di to heptavalent metal or metaloid, Z is a halogen and k is equal to 1 plus the valence of L.

15. A composition as in claim 14 where $LZ_k^-$ is selected from the group consisting of $SbF_6^-$, $BF_4^-$, $AsF_6^-$, and $PF_6^-$; $R^6$ is selected from the group consisting of benzene toluene, xylene, methoxybenzene, chlorobenzene, cumene, p-chlorotoluene, naphthalene, methoxynaphthalene, methylnaphthalene, chloronaphthalene, biphenyl, indene, pyrene, or diphenylsulfide; and $R^7$ is the anion of cyclopentadiene, acetylcyclopentadiene, benzoylcyclopentadiene, butylcyclopentadiene, amylcyclopentadiene or indene.

16. A method of providing a crosslinked polythioether polymer comprising subjecting a composition as in claim 1 to radical generating conditions.

17. A method of providing a polyimide polymer crosslinked by thioether linkages comprising:
providing a formulation comprising a polyimide resin having a plurality of groups of the formula:

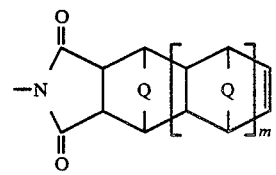

where Q is $CR_2^1$, O, S, $NR^1$ or $SO_2$; $R^1$ is H or alkyl and m is 0-10; a polythiol; wherein the thiol plus the 'ene functionality is greater than four and an effective amount of a catalyst comprising a mixture of a peroxide compound and a $\eta^6$, $\eta^5$ iron arene complex of the formula:

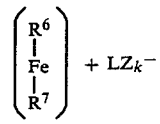

where $R^6$ is an $\eta^6$ arene, $R^7$ is the anion of a cyclopentadienyl compound, L is a di to heptavalent metal or metaloid, Z is a halogen and k is equal to 1 plus the valence of L.

18. A method as in claim 17 wherein the polyimide resin is a compound having a plurality of nadimide groups.

19. A method as in claim 17 wherein $LZ_k^-$ is selected from the group consisting of $SbF_6^-$, $BF_4^-$, $AsF_6^-$, and $PF_6^-$; $R^6$ is selected from the group consisting of benzene toluene, xylene, mesitylene, methoxybenzene, chlorobenzene, cumene, p-chlorotoluene, naphthalene, methoxynaphthalene, methylnaphthalene, chloronaphthalene, biphenyl, indene, pyrene, or diphenylsulfide; and $R^7$ is the anion of cyclopentadiene, acetylcyclopentadiene, benzoylcyclopentadiene, butylcyclopentadiene, amylcyclopentadiene and indene.

20. A method as in claim 16 where the radical initiator is a photoinitiator and the radical generating conditions comprise exposing the composition to light of a wave length effective to activate the photoinitiator.

21. A method as in claim 20 where the photoinitiator is a visible light active photoinitiator.

22. A method as in claim 20 where the photoinitiator comprises a mixture of a peroxide compound and a $\eta^5$, $\eta^6$-iron arene complex salt of the formula:

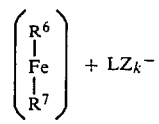

where $R^6$ is an $\eta^6$ arene, $R^7$ is the anion of a cyclopentadieneyl compound, L is a di to heptavalent metal or metaloid, Z is a halogen and k is equal to 1 plus the valence of L.

23. A method as in claim 22 wherein the peroxide compound is a hydroperoxide.

* * * * *

UNITED STATES PATENT AND TRADEMARK OFFICE
CERTIFICATE OF CORRECTION

PATENT NO. : 4,808,638

DATED : February 28, 1989

INVENTOR(S) : Steinkraus, Walter et al

It is certified that error appears in the above-identified patent and that said Letters Patent is hereby corrected as shown below:

Col. 3, line 25, delete "propentyl" and insert - propenyl -

Col. 3, line 31, delete "propentyl" and insert - propenyl -

Signed and Sealed this

Twenty-ninth Day of August, 1989

Attest:

DONALD J. QUIGG

Attesting Officer

Commissioner of Patents and Trademarks